United States Patent
Mishra et al.

(10) Patent No.: US 10,785,115 B2
(45) Date of Patent: Sep. 22, 2020

(54) ALLOCATING ENFORCEMENT OF A SEGMENTATION POLICY BETWEEN HOST AND NETWORK DEVICES

(71) Applicant: Illumio, Inc., Sunnyvale, CA (US)

(72) Inventors: Rupesh Kumar Mishra, Santa Clara, CA (US); Paul James Kirner, Palo Alto, CA (US); Matthew Kirby Glenn, Mountain View, CA (US)

(73) Assignee: Illumio, Inc., Sunnyvale, CA (US)

(*) Notice: Subject to any disclaimer, the term of this patent is extended or adjusted under 35 U.S.C. 154(b) by 0 days.

(21) Appl. No.: 16/172,630

(22) Filed: Oct. 26, 2018

(65) Prior Publication Data
US 2020/0136910 A1 Apr. 30, 2020

(51) Int. Cl.
| | |
|---|---|
| G06F 15/173 | (2006.01) |
| H04L 12/24 | (2006.01) |
| H04L 29/06 | (2006.01) |
| H04L 12/917 | (2013.01) |

(Continued)

(52) U.S. Cl.
CPC ........ H04L 41/0893 (2013.01); H04L 41/046 (2013.01); H04L 41/5022 (2013.01); H04L 47/74 (2013.01); H04L 47/76 (2013.01); H04L 47/805 (2013.01); H04L 63/101 (2013.01)

(58) Field of Classification Search
CPC ............... H04L 41/0893; H04L 41/046; H04L 41/5022; H04L 47/74; H04L 47/805; H04L 47/76; H04L 63/101
See application file for complete search history.

(56) References Cited

U.S. PATENT DOCUMENTS

| | | | |
|---|---|---|---|
| 10,476,745 B1* | 11/2019 | McCormick | .......... H04L 43/062 |
| 2018/0234459 A1 | 8/2018 | Kung et al. | |
| 2019/0089773 A1* | 3/2019 | Dias | ...................... H04L 67/101 |

(Continued)

FOREIGN PATENT DOCUMENTS

| | | |
|---|---|---|
| WO | WO 2017/202334 A1 | 11/2017 |
| WO | WO 2018/024809 A1 | 2/2018 |

OTHER PUBLICATIONS

Wade Holmes; VMWare NSX Micro-segmentation; 2017; VMWare PRESS; 118 pages. (Year: 2017).*

(Continued)

*Primary Examiner* — Richard G Keehn
(74) *Attorney, Agent, or Firm* — Fenwick & West LLP

(57) ABSTRACT

A segmentation server configures enforcement of a segmentation policy by allocating enforcement of management instructions between network devices and hosts. The segmentation policy comprises rules that control communications between workloads. For a particular workload, the segmentation server generates management instructions for controlling communications to and from the particular workload in accordance with the rules. The segmentation server determines an allocation of management instructions between enforcement on a host on which the particular workload executes and enforcement on a network device upstream from the workload. The segmentation server sends configuration information to at least one of the host and the network device in accordance with the allocation to enable enforcement of the management instructions.

20 Claims, 4 Drawing Sheets

(51) Int. Cl.
*H04L 12/911* (2013.01)
*H04L 12/927* (2013.01)

(56) References Cited

U.S. PATENT DOCUMENTS

| | | | |
|---|---|---|---|
| 2019/0123905 A1* | 4/2019 | Kirner | H04L 9/3226 |
| 2019/0222610 A1* | 7/2019 | Kirner | G06F 16/9024 |
| 2019/0258525 A1* | 8/2019 | Glenn | G06F 21/564 |
| 2019/0258804 A1* | 8/2019 | Glenn | G06F 9/5077 |

OTHER PUBLICATIONS

PCT International Search Report and Written Opinion, PCT Application No. PCT/US19/52298, dated Dec. 16, 2019, 16 pages.

* cited by examiner

ALLOCATING ENFORCEMENT OF A SEGMENTATION POLICY BETWEEN HOST AND NETWORK DEVICES

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. In some conventional segmentation systems, a segmentation server distributes management instructions to host endpoints on which the workloads execute. The enforcement modules configure firewalls on the respective host endpoints to enforce the segmentation policy. Alternatively, a segmentation server may generate configurations of firewalls on network devices such as switches and routers upstream from the workloads in order to enforce the segmentation policy.

SUMMARY

A system, non-transitory computer-readable storage medium, and method configures enforcement of a segmentation policy. A segmentation server obtains a segmentation policy comprising a plurality of rules controlling communications between workloads. The segmentation server generates, for a particular workload, a plurality of management instructions for enforcing the rules of the segmentation policy controlling communications to and from the particular workload. The segmentation server obtains, for the particular workload, a connectivity configuration indicating a network device upstream from the particular workload. The segmentation server determines an allocation of the plurality of management instructions between enforcement on a host of a computing device on which the particular workload executes and enforcement on the network device upstream from the workload. The segmentation server sends configuration information based on the plurality of management instructions to at least one of the host and the network device in accordance with the allocation to enable enforcement of the plurality of management instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server configures enforcement of a segmentation policy by allocating enforcement of management instructions between network devices and hosts. The segmentation server determines the allocation based on a desired allocation strategy that may take advantage of the various benefits of enforcing the segmentation policy at different locations while mitigating the disadvantages.

Figure 1:
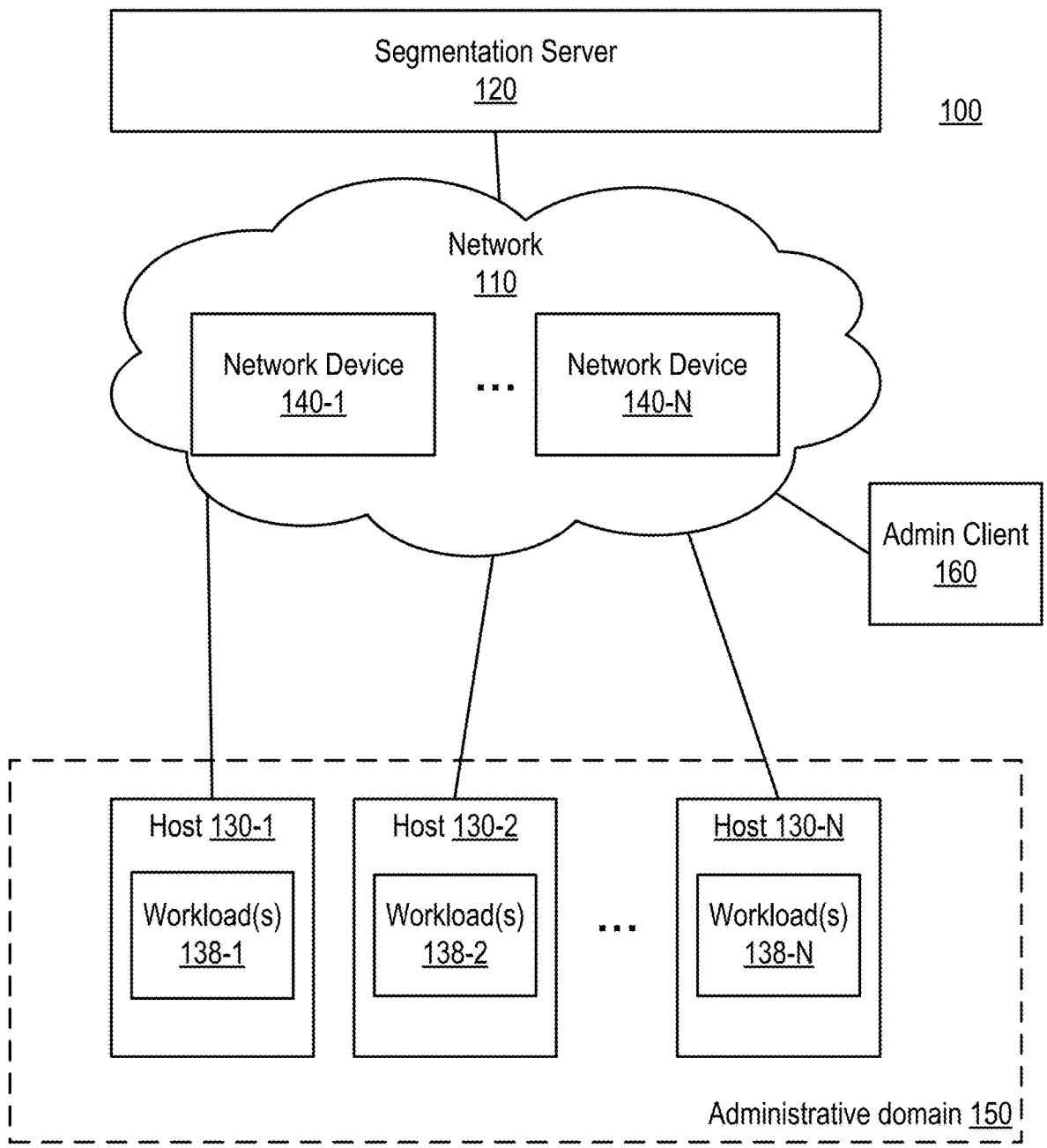
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of hosts 130 (e.g., hosts 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes network devices 140 (e.g., network devices 140-1, . . . , 140-N) that facilitate communications over the network 110. The network devices 140 may include, for example, routers, switches, access points, or other devices that control communications between the workloads 138 over the network 110. The network devices 140 may each include an integrated configurable firewall that enforces a set of firewall rules to permit or block different communications over the network 110. The network devices 140 may additionally include dedicated firewall devices.

The hosts 130 may comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 that may be independently addressable and may perform different independent computing functions. The workloads 138 on the hosts 130 may communicate with other workloads 138 on different hosts 130 within the administrative domain 150 to perform various tasks.

The segmentation server 120 is a computer (or set of computers) that obtains and stores information about the hosts 130 on the network 120 and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. For example, a rule pertaining to a particular workload 138 may specify a whitelist of workloads 138 with which the particular workload 138 is permitted to communicate. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). A given rule may comprise an inbound rule or an outbound rule. An inbound rule for a particular workload 138 allows the particular workload 138 to accept inbound connections from specified other workloads 138 and permits the particular workload 138 to communicate with the specified other workloads bidirectionally over established connections. An outbound rule for a particular workload 138 allows the particular workload to send outbound connection requests to specified other workloads 138 and allows the particular workload 138 to communicate with the specified other workloads bidirectionally over established connections. Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In some embodiments, the segmentation policy may furthermore include rules that instead disallow communications of a particular workload 138 with a blacklist of certain specified workloads 138 that the particular workload 138 is not permitted to communicate with. Additionally, a segmentation policy may include a combination of rules using blacklists and whitelists.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers for workloads 138, and membership information indicating one or more groups of workloads 138 to which each workload 138 belongs (e.g., as defined by the respective label sets for the workloads 138).

Table 2 illustrates an example of information stored by the segmentation server 120. Here, the workload ID(s) represent the workload identifier for the workload(s) 138 executing on each host 130. The workload identifier may comprise, for example, an IP address or other identifier that uniquely identifies the workload 138. The memberships represent groups to which one or more workloads 138 executing on the host 130 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

The segmentation policy may be enforced by the hosts 130, by one or more of the network devices 140, or by a combination thereof. Different rules may be allocated for enforcement on a relevant host 130, on a relevant network device 140, or both as will be described in further detail below. To enable enforcement of at least a portion of segmentation policy on one or more hosts 130, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different hosts 130 so that each host 130 gets only the management instructions relevant to the rules it is assigned to enforce. Here, the segmentation server 120 may determine which rules are relevant to a given host 130 and distribute the relevant rules to that host 130. A rule may be deemed relevant to a particular host 130 if the rule is assigned to be enforced by a host (as opposed to a network device 140) and the particular host 130 executes one or more workloads 138 that belongs to a group (defined by one or more label sets) referenced by the rule. The segmentation server 120 may furthermore determine which membership information is relevant to each host 130 and distribute the relevant membership information to each respective host 130. Here, membership information may be relevant to a particular host 130 if it defines membership of a group referenced by a rule deemed relevant to the particular host 130. Further details of a segmentation system for controlling communications between hosts 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

To enable enforcement of at least a portion of the segmentation policy at the network devices 140, the segmentation server 110 obtains a topology of the network 110 specifying the connections between the network devices 140 and the hosts, and generates firewall configurations for the network devices 140 based on the rules and the topology. For example, to enforce a rule pertaining to a particular workload 138, the segmentation server 110 may identify a network device 140 upstream from the particular workload 138 and configure a firewall of the network device 140 to enforce the rule to allow or prevent certain communications with the particular workload 138.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

Figure 2:
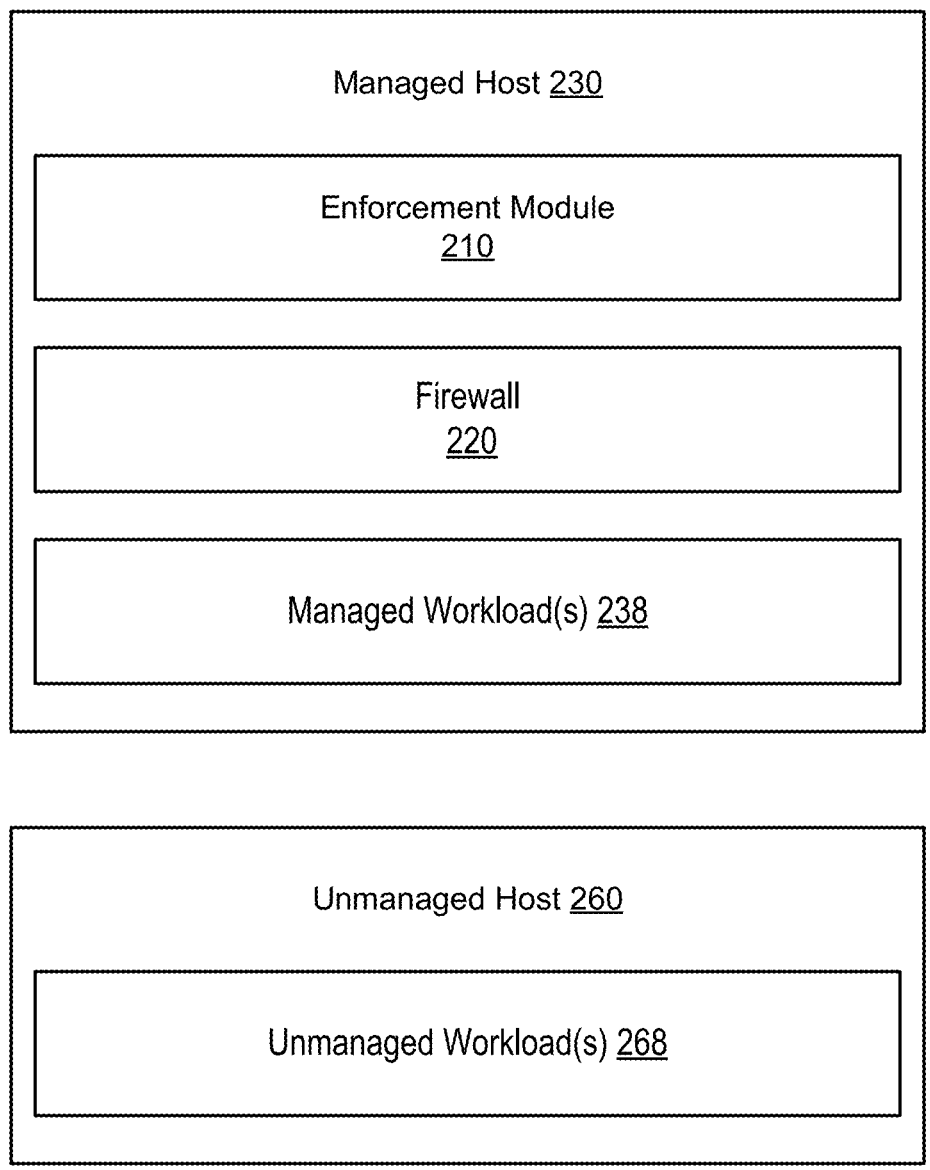
FIG. 2 is a block diagram illustrating an example embodiment of a host.

FIG. 2 illustrates example embodiments of a host 130. A host 130 may comprise either a managed host 230 that hosts one or more managed workloads 238 or an unmanaged host 260 that hosts one or more unmanaged workloads 268. The managed host 230 comprises an enforcement module 210, a firewall 220, and one or more managed workloads 238. The firewall 220 monitors and controls incoming and outgoing traffic to and from a managed workload 238 of the managed host 230 in accordance with a set of firewall rules. The firewall 220 may comprise, for example, an operating system-level firewall, an Internet Protocol security (IPsec) engine, or a network traffic filtering engine (e.g., based on the Windows Filtering Platform (WFP) development platform). The firewall 220 may be configured in accordance with a table in which each entry specifies a workload identifier (e.g., IP address) of another workload 138 that the managed workload 238 is permitted to communicate with, a port over which communications are permitted, and a permitted protocol for the communications. The firewall 220 may furthermore operate to block communications that are not expressly permitted in the firewall rules.

The enforcement module 210 receives the management instructions including the relevant rules and the relevant membership information from the segmentation server 120 and translates the management instructions from a high level of abstraction to a low level of abstraction. For example, for a given rule that permits communication between a managed workload 238 executing on the managed host 230 and a group of other workloads 138 having a label set A, the enforcement module 210 determines from the relevant membership information, workload identifiers for each of the workloads 138 having the label set A, and configures firewall rules to permit communications with the identified workloads 138 in accordance with any restrictions (e.g., ports and protocols) specified in the given rule.

The unmanaged host 260 lacks the enforcement module 210 and thus is not capable of directly enforcing rules of the segmentation policy. An unmanaged workload 268 executing on the unmanaged host 260 may still be assigned label sets in the same way as managed workload 238. Communications to and from an unmanaged workload 268 may be controlled indirectly through enforcement on the managed hosts 230 or on the network devices 140. For example, a managed host 230 may enforce a rule that prevents communication between a managed workload 238 and the unmanaged workload 268. Furthermore, a network device 140 upstream from the unmanaged workload 268 may be configured to enforce a rule that prevents communication to or from the unmanaged workload 268.

Figure 3:
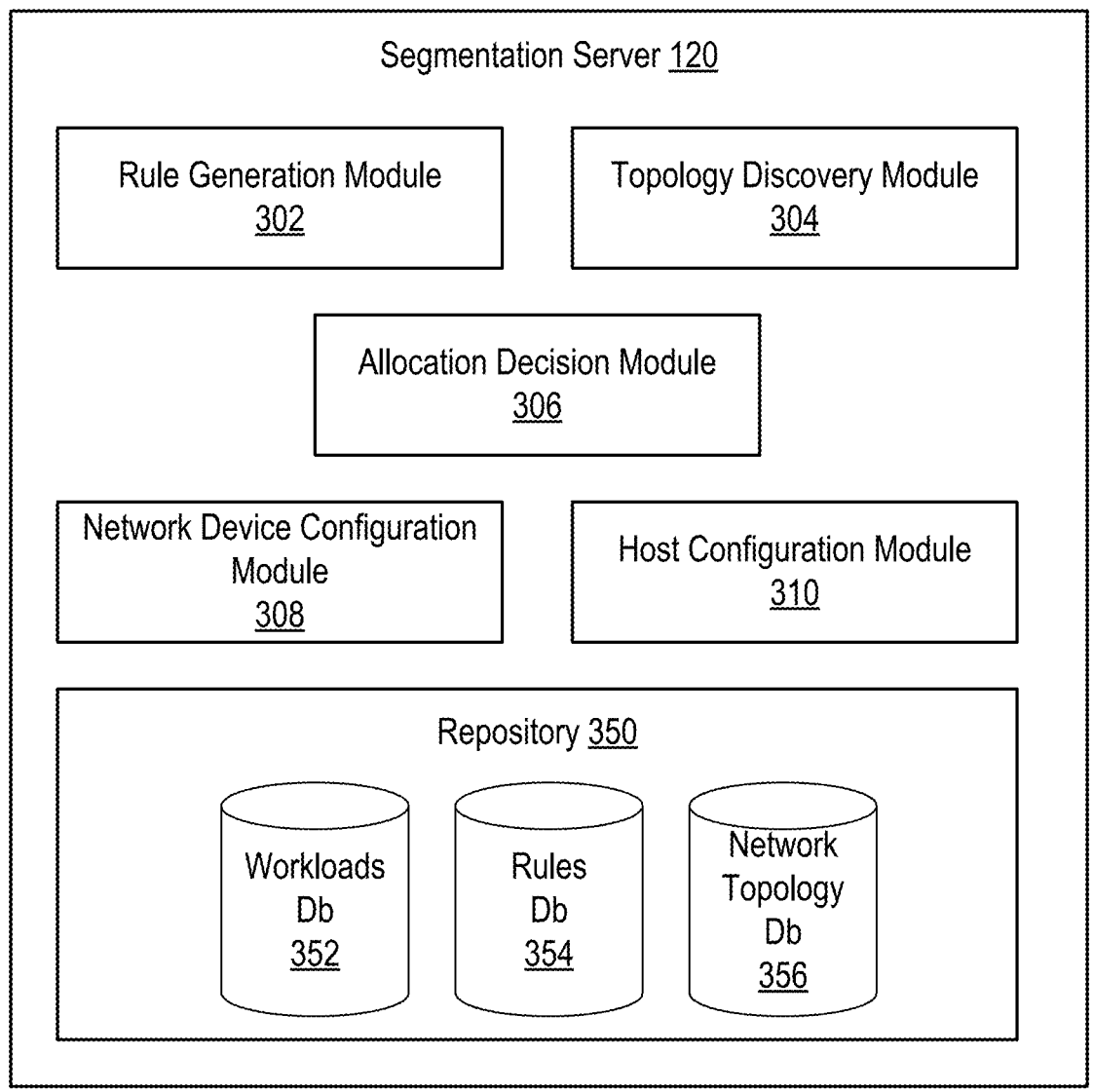
FIG. 3 is a block diagram illustrating an example embodiment of a segmentation server.

FIG. 3 is a high-level block diagram of an embodiment of a segmentation server 120. The segmentation server 120 comprises a rule generation module 302, a topology discovery module 304, an allocation decision module 306, a network device configuration module 308, a host configuration module 310, and a repository 350. The repository 350 may comprise a workloads database 352 that stores associations between workloads 138 and their respective label sets, a rule database 354 that stores a segmentation policy as a set of rules, and a network topology database 356 that stores a network topology for an administrative domain 150. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The rule generation module 302 generates or updates a segmentation policy comprising a set of rules and generates management instructions for enforcing the rules. The segmentation policy may be generated based on configuration inputs received via the administrative client 160 providing a desired segmentation strategy. The rule generation module 302 may generate the segmentation policy at least in part based on observed traffic flows between workloads 138. For example, the rule generation module 302 may observe how workloads 138 communicate under normal conditions and generate a policy that permits those communications while preventing other communications. Embodiments of processes for generating rules are further described in U.S. Pat. No. 9,485,279 issued on Nov. 1, 2016 to Paul J. Kirner, et al., which is incorporated by reference herein.

The topology discovery module 304 discovers a topology of the network 110 and stores it to the network topology database 356. For example, the topology discovery module 304 may detect network devices 140 and workloads 138 on the network 110 and detect the interconnections between the network devices 140 and the hosts 130 on which the workloads 138 execute. For example, in an embodiment, the topology discovery module 304 obtains traffic flow information from different ports of individual network devices 140 that includes identifiers for the source and destination workloads 138 associated with the traffic. Based on these identifiers, the topology discovery module 304 can detect which workloads 138 are behind a particular network device 140 and to what ports they are connected. By aggregating this information, the topology discovery module 304 can generate an interconnection graph describing the connections between the traffic devices 140 and the hosts 130 on which the workloads 138 execute. Alternatively, discovery protocols such as LLDP, CDP, or ARP may be used to discover the topology. The topology discovery module 304 may furthermore discover and store characteristics and capabilities of the network devices 140. For example, the topology discovery module 304 may determine if a particular network device 140 is capable of egress filtering (i.e., blocking outgoing traffic) or whether the particular network device 140 is capable of operating as stateful (as opposed to a stateless) firewall. In other alternative embodiments, the topology discovery module 304 may be omitted and the network topology database 356 may instead be manually configured by an administrator via the administrative device 160.

The allocation decision module 306 determines an enforcement allocation that specifies whether particular management instructions of the segmentation policy should be enforced by a host 130 or by a network device 140. For example, for each management instruction relevant to a particular workload 138, the allocation decision module 306 determines whether to enforce that instruction at the host 130 that hosts the workload 138 or on a network device 140 upstream from the workload 138. The allocation decision may be based on a particular configured allocation strategy and the discovered network topology, examples of which are discussed below.

Enforcement at the host 130 and at the network device 140 each may have advantages and disadvantages. For example, hosts 130 are generally beneficially able to implement a stateful firewall while at least some network devices 140 may enable only stateless firewall enforcement. Furthermore, hosts 130 may typically have a large memory space available to support firewall rules for the hosts 130, while a network device 140 may have more limited memory space and may be able to support fewer firewall rules associated with a given workload 138. Additionally, a host 130 may be able to enforce firewall rules that more highly tailored to workloads 138 executing on them by implementing rules specific to particular workload attributes. However, a network device 140 may be limited to implemented firewall rules based on a more limited set of attributes such as network protocols. On the other hand, packet processing latency is typically lower for firewall rules enforced on a network device 140 relative to rules enforced by a host 130. Various allocation strategies may be employed to take advantage of these trade-offs under different circumstances, as described below.

Under one allocation strategy, the allocation decision module 306 allocates management instructions based on whether relevant workloads 138 relating to the management instructions are managed workloads 238 or unmanaged workloads 268. Here, the allocation decision module 306 may identify unmanaged workloads 268 executing on unmanaged hosts 260 that do not include an enforcement agent 210, and may allocate management instructions controlling communications to and from those unmanaged workloads 268 for enforcement by a network device 140 upstream from the unmanaged host 260. The allocation decision module 306 may allocate management instructions associated with managed workloads 138 executing on hosts 130 having an enforcement agent 210 to the respective hosts 130 for enforcement by the respective enforcement agents 210.

Under another allocation strategy, the allocation decision module 306 allocates management instructions based on whether or not they relate to workloads 138 providing latency sensitive services. Here, the allocation decision module 306 may initially identify workloads 138 that provide latency sensitive services. The allocation decision module 306 may allocate management instructions associated with the workloads 138 providing the latency sensitive services for enforcement by an upstream network device 140, while allocating management instructions associated with workloads 138 providing non-latency sensitive services for enforcement by the hosts 130. This allocation strategy is beneficial because network devices 140 can generally provide enforcement with lower latency, thereby improving overall performance of these services.

In an embodiment, when enforcing this allocation strategy, the allocation decision module 306 may furthermore allocate management instructions to the host 130 that whitelist the latency sensitive services so that the host 130 does not interfere with management of these services by the network device 140. Similarly, the allocation decision module 306 may furthermore allocate management instructions to the network device 130 that whitelist the non-latency sensitive services so that the network device 130 does not interfere with management of these services by the host 130.

Under another allocation strategy, the allocation decision module 306 may allocate management instructions by giving first priority to enforcement on the network devices 140 and second priority to enforcement on the hosts 130 when it is not possible to enforce additional management instructions on the network devices 140. Here, the allocation decision module 306 may identify, resource constraints of the network devices 140 (e.g., a ternary content addressable memory (TCAM) size limit) that limits the number of management instructions enforceable by a network device 140. For a management instruction affecting a given workload 138, the allocation decision module 306 may allocate the management instructions for enforcement by a network device 140 upstream from the workload 138 unless the network device 140 has reached its resource limit. In that case, the allocation decision module 306 may then instead allocate the instruction for enforcement by the host 130 that hosts the workload 138. Furthermore, in an embodiment, the allocation decision module 306 may identify a priority level associated with different services provided by the workloads 138 and controlled by the management instructions. If an initial allocation of management instructions to a network device 140 would cause the network device 140 to exceed its resource capability, an adjusted allocation may be determined that re-allocates the management instructions associated with lower priority services for enforcement by the host 130 while enforcing the higher priority services on the network device 140.

Under another allocation strategy, the allocation decision module 306 may allocate the management instructions pertaining to a particular workload 138 to apply a coarse enforcement policy at a network device 140 to coarsely filter communications with the particular workload 138 while applying fine enforcement policy on the host 130 to finely filter communications with the particular workload 138. For example, a rule of a segmentation policy may be permit communications in accordance with a specified port and protocol between a particular workload 138 and a set of specific workloads 138 that all reside on the same subnet. Here, one or more coarse rules may be allocated for enforcement on the network device 140 that coarsely filters communications to permit any communications between the particular workload 138 and workloads 138 on the subnet. One or more fine rules may be allocated for enforcement on the host 130 that finely filters communications to permit only communications with the specific set of other workloads 138 (e.g., identified by IP address) and that are in accordance with the specified port and protocol. In another example, the coarse rule allocated for enforcement on the network device 140 may instead coarsely filter communications based on port and protocol. For example, the coarse rule may coarsely filter communications to permit any communications with the particular workload 138 that conform to the particular port and protocol (regardless of the IP address). One or more fine rules may be allocated for enforcement on the host 130 that finely filters communications to permit only communications with the specific set of other workloads 138 (e.g., identified by IP address) and that are in accordance with the specified port and protocol. In alternative embodiments, coarse filtering by the network device 140 may be based on other parameters. This allocation strategy beneficially enables coarse rules controlling a large number of communications to be enforced with low latency through enforcement at the network device 140, while still limiting the total number of rules enforced at the network device 140 so as to not exceed the memory constraints of the network device 140.

Under another allocation strategy, the allocation decision module 306 may allocate the management instructions based on whether they relate to controlling communications associated with a stateless protocol or a stateful protocol. For example, the allocation decision module 306 may allocate management instructions associated with stateless communication protocols for enforcement by the network devices 140, and may allocate management instructions associated with a stateful communication protocol for enforcement by the hosts 130. This allocation strategy is beneficial because some network devices 140 are unable to directly implement stateful enforcement.

Under another allocation strategy, the allocation decision module 306 may allocate the management instructions based on whether they pertain to rules that specify a whitelist of workloads 138 with which communication is permitted or rules that specify a blacklist of workloads 138 with which communication is disallowed. For example, the allocation decision module 306 may allocate management instructions disallowing communications of a particular workload with a blacklist of other workloads for enforcement by the network device 140, and may allocate management instructions permitting communications of the particular workload with a whitelist of other workloads for enforcement by the host 130.

Under another allocation strategy, the allocation decision module 306 identifies management instructions that identify workloads 138 by specific IP addresses, and allocates these management instructions for enforcement by a network device 140. For example, a management instruction specifying that a particular workload 138 can communicate with a set of workloads 138 having IP addresses 192.168.0.0 and 192.168.0.1 may be allocated for enforcement by a network device 140 upstream from the particular workload 138. The allocation decision module 306 identifies management instructions that instead identify workloads by their labels, and allocates these management instructions for enforcement by the host 130. For example, a management instruction specifying that a particular workload 138 can communicate with workloads 138 having label sets {role: database; location: New York} may be allocated for enforcement by the host 130 executing the particular workload 138.

The allocation decision module 306 may further implement allocation strategies that combine two or more of the above-described strategies. For example, two or more strategies may be assigned different importance levels and if the allocation decision of two different applied strategies conflicts, the allocation decision module 306 resolves the conflict by applying the strategy with the higher importance level.

The host configuration module 310 obtains management instructions allocated for enforcement on the hosts 130 and distributes the relevant management instructions to the respective hosts 130. For efficiency of distribution, the host configuration module 310 may transmit to a given host 130, only instructions relevant to the workloads 138 executing on a given host 130 in the manner described above.

The network device configuration module 308 obtains the management instructions allocated for enforcement by a network device 140, determines which network device 140 will enforce each particular management instruction, and configures the network devices 140 to implement the respective instructions. In some cases, a network device 140 may execute an enforcement module 210 similar to the enforcement module 210 executing on the host 130. For these network devices 140, the network device configuration module 308 may send the management instructions directly to the network device 140 and the network device 140 can process the management instructions to generate the appropriate firewall configuration. For other network devices 140 that do not have an enforcement module 210, the network device configuration module 308 may generate the firewall configuration directly and communicate with the network device 140 (e.g., via an application programming interface) to configure the firewall consistent with the management instructions.

Figure 4:
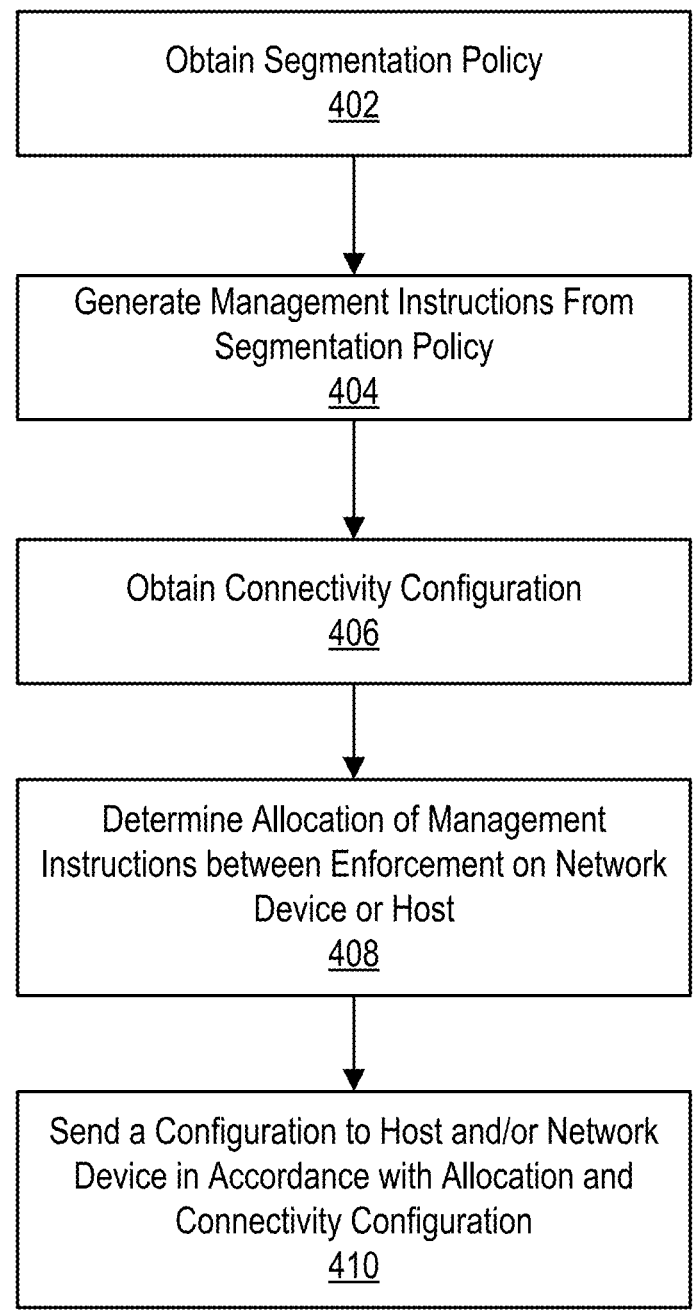
FIG. 4 is a flowchart illustrating an example embodiment of a process for configuring enforcement of a segmentation policy.

FIG. 4 illustrates an example embodiment of a process for configuring enforcement of a segmentation policy. The segmentation server 110 obtains 402 a segmentation policy. For a particular workload 138, the segmentation server 110 generates 404 management instructions for enforcing rules of the segmentation policy controlling communications to and from the particular workload 138. The segmentation server 110 furthermore obtains 406 a connectivity configuration indicating a network topology that specifies at least one network device 140 upstream from the particular workload 138 where management instructions could optionally be enforced. The segmentation server 110 determines 408, based on a configured allocation strategy, an allocation of the management instructions between enforcement by the host or enforcement by the network device 140. The segmentation server 110 then sends 410 a configuration to at least one of the host 130 and the network device 140 in accordance with the allocation and the connectivity configuration to enable enforcement of the management instructions. For enforcement on the host 130 or a network device 140 having an enforcement module 210, the segmentation server 110 may send the configuration by directly sending the management instructions. An enforcement module 210 on the host 130 or the network device 140 may then generate the firewall configuration based on the management instructions. For enforcement on a network device 140 that does not have an enforcement module 210, the segmentation server 110 may generate a firewall configuration for the network device 140 based on the management instructions and communicate the configuration to the network device 140.

The above-described embodiments enables flexibility in enforcement of a segmentation policy by coordinating enforcement between hosts 130 and network devices 140. This solution enables implementation of various allocation strategies that may take advantage of the different benefits of enforcement on the network device 140 and on the host 130 and mitigating potential disadvantages of each. In this way, an allocation can be applied that beneficially enables enforcement of a segmentation policy in a manner that provides more efficient use of memory, computing resources, and network bandwidth relative to conventional segmentation systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for configuring enforcement of a segmentation policy, the method comprising:
   obtaining a segmentation policy comprising a plurality of rules controlling communications between workloads;
   generating, for a particular workload, a plurality of management instructions for enforcing the rules of the segmentation policy controlling communications to and from the particular workload;
   obtaining, for the particular workload, a connectivity configuration indicating a network device upstream from the particular workload;
   determining an allocation of the plurality of management instructions between enforcement on a host of a computing device on which the particular workload executes and enforcement on the network device upstream from the workload, comprising:
      detecting that the particular workload is an unmanaged workload that does not have an enforcement module installed for enforcing the plurality of management instructions; and
      responsive to detecting that the particular workload is the unmanaged workload, allocating the plurality of management instructions for enforcement by the network device; and
   sending configuration information based on the plurality of management instructions to at least one of the host and the network device in accordance with the allocation to enable enforcement of the plurality of management instructions.

2. The method of claim 1, further comprising:
generating, for a second workload, a second plurality of management instructions for enforcing the rules of the segmentation policy controlling communications to and from the second workload;
obtaining, for the second workload, a second connectivity configuration indicating a network device upstream from the second workload;
determining an allocation of the second plurality of management instructions between enforcement on a host of a computing device on which the second workload executes and enforcement on the network device upstream from the second workload, comprising:
detecting that the second workload provides or consumes one or more latency sensitive services; and
allocating a subset of the second plurality of management instructions pertaining to the one or more latency sensitive services for enforcement by the network device.

3. The method of claim 1, further comprising:
generating, for a second workload, a second plurality of management instructions for enforcing the rules of the segmentation policy controlling communications to and from the second workload;
obtaining, for the second workload, a second connectivity configuration indicating a network device upstream from the second workload;
determining an allocation of the second plurality of management instructions between enforcement on a host of a computing device on which the second workload executes and enforcement on the network device upstream from the second workload, comprising:
detecting a limit to a number of the second plurality of management instructions enforceable on the network device upstream from the second workload;
allocating for enforcement by the network device upstream from the second workload, a first set of the second plurality of management instructions corresponding to the limit; and
allocating for enforcement by the host of the computing device on which the second workload executes, a second set of the second plurality of management instructions over the limit.

4. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
detecting that the particular workload provides or consumes one or more latency sensitive services; and
allocating a subset of the plurality of management instructions pertaining to the one or more latency sensitive services for enforcement by the network device.

5. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
detecting a limit to a number of the plurality of management instructions enforceable on the network device upstream from the particular workload;
allocating for enforcement by the network device upstream from the particular workload, a first set of the plurality of management instructions corresponding to the limit; and
allocating for enforcement by the host of the computing device on which the particular workload executes, a second set of the plurality of management instructions over the limit.

6. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
generating, from the plurality of management instructions, one or more coarse rules that coarsely filter communications with the particular workload;
generating, from the plurality of management instructions, one or more fine rules that finely filter communications with the particular workload;
allocating the coarse rules for enforcement by the network device upstream from the particular workload; and
allocating the fine rules for enforcement by the host of the computing device on which the particular workload executes.

7. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;

determining an allocation of the plurality of management
instructions between enforcement on a host of a computing device on which the particular workload executes and enforcement on the network device upstream from the particular workload, comprising:
detecting a first set of the plurality of management instructions applicable to communications of the particular workload using a stateless protocol;
detecting a second set of the plurality of management instructions applicable to communications of the particular workload using a stateful protocol; and
allocating the first set of the plurality of management instructions for enforcement by the network device upstream from the particular workload; and
allocating the second set of the plurality of management instructions for enforcement by the host of the computing device on which the particular workload executes.

8. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
identifying a first set of the plurality of management instructions disallowing communications of the second particular workload according to a black list of other workloads;
identifying a second set of the second plurality of management instructions permitting communications of the particular workload according to a white list of other workloads;
allocating the first set of the plurality of management instructions for enforcement by the network device upstream from the particular workload; and
allocating the second set of the plurality of management instructions for enforcement by the host of the computing device on which the particular workload executes.

9. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
identifying a first set of the plurality of management instructions applicable to communications of the particular workload with one or more other workloads identified in the first set of the plurality of management instructions by respective IP addresses associated with the one or more other workloads;
identifying a second set of the plurality of management instructions applicable to communications of the particular workload with a group of other workloads identified in the second set of the plurality of management instructions by labels associated with the group of other workloads;
allocating the first set of the plurality of management instructions for enforcement by the network device upstream from the particular workload; and
allocating the second set of the plurality of management instructions for enforcement by the host of the computing device on which the particular workload executes.

10. A method for configuring enforcement of a segmentation policy, the method comprising:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
determining an initial allocation according to initial allocation criteria that allocates for enforcement by the network device upstream from the particular workload, a first set of the plurality of management instructions applicable to communications involving a first service having a first priority and a second set of the plurality of management instructions applicable to communications involving a second service having a second priority lower than the first priority;
detecting that the initial allocation of the plurality of management instructions for enforcement by the network device upstream from the particular workload exceeds a resource capability of the network device upstream from the particular workload; and
determining an adjusted allocation by re-allocating for enforcement by the host of the computing device on which the particular workload executes, at least a portion of the second set of the plurality of management instructions applicable to the second service having the second priority.

11. A non-transitory computer-readable storage medium storing instructions for configuring enforcement of a segmentation policy, the instructions when executed by a processor cause the processor to perform steps including:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;

determining an allocation of the plurality of management instructions between enforcement on a host of a computing device on which the particular workload executes and enforcement on the network device upstream from the workload, comprising:
  detecting that the particular workload is an unmanaged workload that does not have an enforcement module installed for enforcing the plurality of management instructions; and
  responsive to detecting that the particular workload is the unmanaged workload, allocating the plurality of management instructions for enforcement by the network device; and
sending configuration information based on the plurality of management instructions to at least one of the host and the network device in accordance with the allocation to enable enforcement of the plurality of management instructions.

12. The non-transitory computer-readable storage medium of claim 11, the steps further comprising:
  generating, for a second workload, a second plurality of management instructions for enforcing the rules of the segmentation policy controlling communications to and from the second workload;
  obtaining, for the second workload, a second connectivity configuration indicating a network device upstream from the second workload;
  determining an allocation of the second plurality of management instructions between enforcement on a host of a computing device on which the second workload executes and enforcement on the network device upstream from the second workload, comprising:
    detecting that the second workload provides or consumes one or more latency sensitive services; and
    allocating a subset of the second plurality of management instructions pertaining to the one or more latency sensitive services for enforcement by the network device.

13. The non-transitory computer-readable storage medium of claim 11, the steps further comprising:
  generating, for a second workload, a second plurality of management instructions for enforcing the rules of the segmentation policy controlling communications to and from the second workload;
  obtaining, for the second workload, a second connectivity configuration indicating a network device upstream from the second workload;
  determining an allocation of the second plurality of management instructions between enforcement on a host of a computing device on which the second workload executes and enforcement on the network device upstream from the second workload, comprising:
    detecting a limit to a number of the second plurality of management instructions enforceable on the network device upstream from the second workload;
    allocating for enforcement by the network device upstream from the second workload, a first set of the second plurality of management instructions corresponding to the limit; and
    allocating for enforcement by the host of the computing device on which the second workload executes, a second set of the second plurality of management instructions over the limit.

14. A non-transitory computer-readable storage medium storing instructions for configuring enforcement of a segmentation policy, the instructions when executed by a processor cause the processor to perform steps including:
  obtaining a segmentation policy comprising a plurality of rules controlling communications between workloads;
  generating, for a particular workload, a plurality of management instructions for enforcing the rules of the segmentation policy controlling communications to and from the particular workload;
  obtaining, for the particular workload, a connectivity configuration indicating a network device upstream from the particular workload;
  determining an allocation of the plurality of management instructions between enforcement on a host of a computing device on which the particular workload executes and enforcement on the network device upstream from the particular workload, comprising:
    detecting that the particular workload provides or consumes one or more latency sensitive services; and
    allocating a subset of the plurality of management instructions pertaining to the one or more latency sensitive services for enforcement by the network device.

15. A non-transitory computer-readable storage medium storing instructions for configuring enforcement of a segmentation policy, the instructions when executed by a processor cause the processor to perform steps including:
  obtaining a segmentation policy comprising a plurality of rules controlling communications between workloads;
  generating, for a particular workload, a plurality of management instructions for enforcing the rules of the segmentation policy controlling communications to and from the particular workload;
  obtaining, for the particular workload, a connectivity configuration indicating a network device upstream from the particular workload;
  determining an allocation of the plurality of management instructions between enforcement on a host of a computing device on which the particular workload executes and enforcement on the network device upstream from the particular workload, comprising:
    detecting a limit to a number of the plurality of management instructions enforceable on the network device upstream from the particular workload;
    allocating for enforcement by the network device upstream from the particular workload, a first set of the plurality of management instructions corresponding to the limit; and
  allocating for enforcement by the host of the computing device on which the particular workload executes, a second set of the plurality of management instructions over the limit.

16. A non-transitory computer-readable storage medium storing instructions for configuring enforcement of a segmentation policy, the instructions when executed by a processor cause the processor to perform steps including:
  obtaining a segmentation policy comprising a plurality of rules controlling communications between workloads;
  generating, for a particular workload, a plurality of management instructions for enforcing the rules of the segmentation policy controlling communications to and from the particular workload;
  obtaining, for the particular workload, a connectivity configuration indicating a network device upstream from the particular workload;
  determining an allocation of the plurality of management instructions between enforcement on a host of a computing device on which the particular workload executes and enforcement on the network device upstream from the particular workload, comprising:

generating, from the plurality of management instructions, one or more coarse rules that coarsely filter communications with the particular workload;
generating, from the plurality of management instructions, one or more fine rules that finely filter communications with the particular workload;
allocating the coarse rules for enforcement by the network device upstream from the particular workload; and
allocating the fine rules for enforcement by the host of the computing device on which the particular workload executes.

17. A non-transitory computer-readable storage medium storing instructions for configuring enforcement of a segmentation policy, the instructions when executed by a processor cause the processor to perform steps including:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
detecting a first set of the plurality of management instructions applicable to communications of the particular workload using a stateless protocol;
detecting a second set of the plurality of management instructions applicable to communications of the particular workload using a stateful protocol; and
allocating the first set of the plurality of management instructions for enforcement by the network device upstream from the particular workload; and
allocating the set of the plurality of management instructions for enforcement by the host of the computing device on which the particular workload executes.

18. A non-transitory computer-readable storage medium storing instructions for configuring enforcement of a segmentation policy, the instructions when executed by a processor cause the processor to perform steps including:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
identifying a first set of the plurality of management instructions disallowing communications of the particular workload according to a black list of other workloads;
identifying a second set of the plurality of management instructions permitting communications of the particular workload according to a white list of other workloads;
allocating the first set of the plurality of management instructions for enforcement by the network device upstream from the particular workload; and
allocating the second set of the plurality of management instructions for enforcement by the host of the computing device on which the particular workload executes.

19. A non-transitory computer-readable storage medium storing instructions for configuring enforcement of a segmentation policy, the instructions when executed by a processor cause the processor to perform steps including:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:
identifying a first set of the plurality of management instructions applicable to communications of the particular workload with one or more other workloads identified in the first set of the plurality of management instructions by respective IP addresses associated with the one or more other workloads;
identifying a second set of the plurality of management instructions applicable to communications of the particular workload with a group of other workloads identified in the second set of the plurality of management instructions by labels associated with the group of other workloads;
allocating the first set of the plurality of management instructions for enforcement by the network device upstream from the particular workload; and
allocating the second set of the plurality of management instructions for enforcement by the host of the computing device on which the particular workload executes.

20. A non-transitory computer-readable storage medium storing instructions for configuring enforcement of a segmentation policy, the instructions when executed by a processor cause the processor to perform steps including:
obtaining a segmentation policy comprising a plurality of rules controlling communications between workloads;
generating, for a particular workload, a plurality of management instructions for enforcing the rules of the segmentation policy controlling communications to and from the particular workload;
obtaining, for the particular workload, a connectivity configuration indicating a network device upstream from the particular workload;
determining an allocation of the plurality of management instructions between enforcement on a host of a computing device on which the particular workload executes and enforcement on the network device upstream from the particular workload, comprising:

determining an initial allocation according to initial allocation criteria that allocates for enforcement by the network device upstream from the particular workload, a first set of the plurality of management instructions applicable to communications involving a first service having a first priority and a second set of the plurality of management instructions applicable to communications involving a second service having a second priority lower than the first priority;

detecting that the initial allocation of the plurality of management instructions for enforcement by the network device upstream from the particular workload exceeds a resource capability of the network device upstream from the particular workload; and determining an adjusted allocation by re-allocating for enforcement by the host of the computing device on which the particular workload executes, at least a portion of the second set of the plurality of management instructions applicable to the second service having the second priority.

* * * * *